United States Patent [19]

Allen

[11] 3,934,531
[45] Jan. 27, 1976

[54] OCEAN GOING CARGO TRANSPORT SYSTEM

[76] Inventor: Rudolph A. Allen, 1419 Second West, Apt. 303, Seattle, Wash. 98119

[22] Filed: July 18, 1974

[21] Appl. No.: 489,762

[52] U.S. Cl. .................................... 114/63; 114/72
[51] Int. Cl.² ........................................... B63B 9/00
[58] Field of Search .............................. 114/40–43, 114/56, 63, 65 R, 67 R, 72, 73, 77 R, 77 A

[56] References Cited
UNITED STATES PATENTS

| | | | |
|---|---|---|---|
| 3,410,240 | 11/1968 | Hutchison et al. | 114/56 |
| 3,434,445 | 3/1969 | Crumley | 114/72 |

FOREIGN PATENTS OR APPLICATIONS

| | | | |
|---|---|---|---|
| 1,317,347 | 11/1963 | France | 114/56 |

*Primary Examiner*—Trygve M. Blix
*Assistant Examiner*—Jesus D. Sotelo
*Attorney, Agent, or Firm*—Christensen, O'Connor, Garrison & Havelka

[57] ABSTRACT

An elongated flat bottom, vertical side cargo unit vessel with a specially configured high-speed bow featuring a forwardly cantilevered horizontal bottom panel of full hull width, predetermined projecting length and vertical thickness controlling bow wave of the hull, with a multi-skeged upsloped stern bottom. A plurality of detachably connected power module vessels and a single control module vessel arranged abreast are detachably connected to each other and to the stern. Submerged to adjustable depths, torpedo-shaped drive units of the power module vessels support upright housings thereon projecting above water level and pass through flotation collars which provide flotation and stability for the power module vessels as independent craft when detached from the cargo unit vessel. An elevatable helm house with monitor and control apparatus on the control module vessel provides control for the power module vessels and cargo unit vessel from a suitable vantage point. The control module vessel and power module vessels when detached from the cargo unit vessel hull become independent seagoing vessels capable in a group or separately of serving as life saving vessels, work boats or otherwise.

25 Claims, 19 Drawing Figures

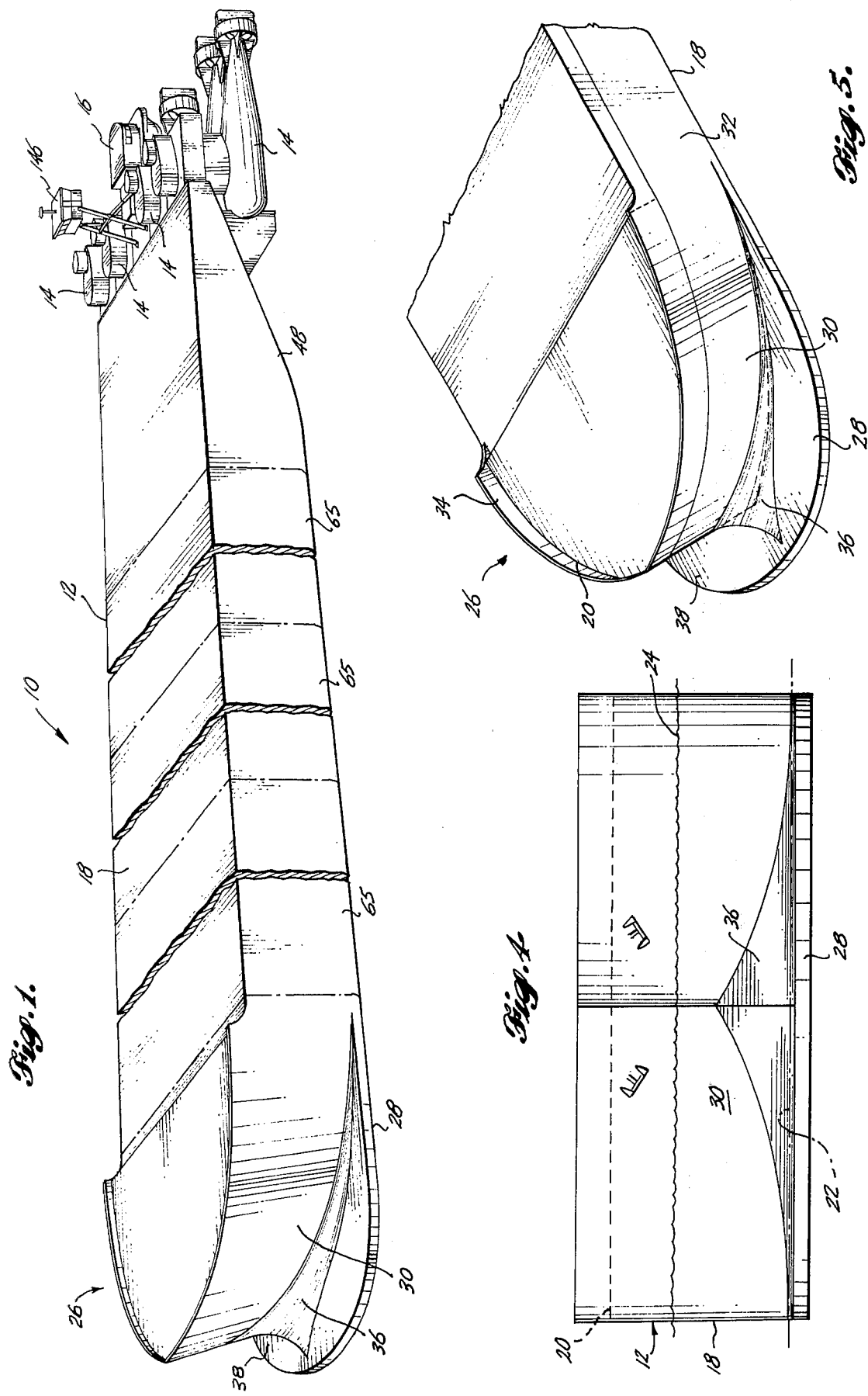

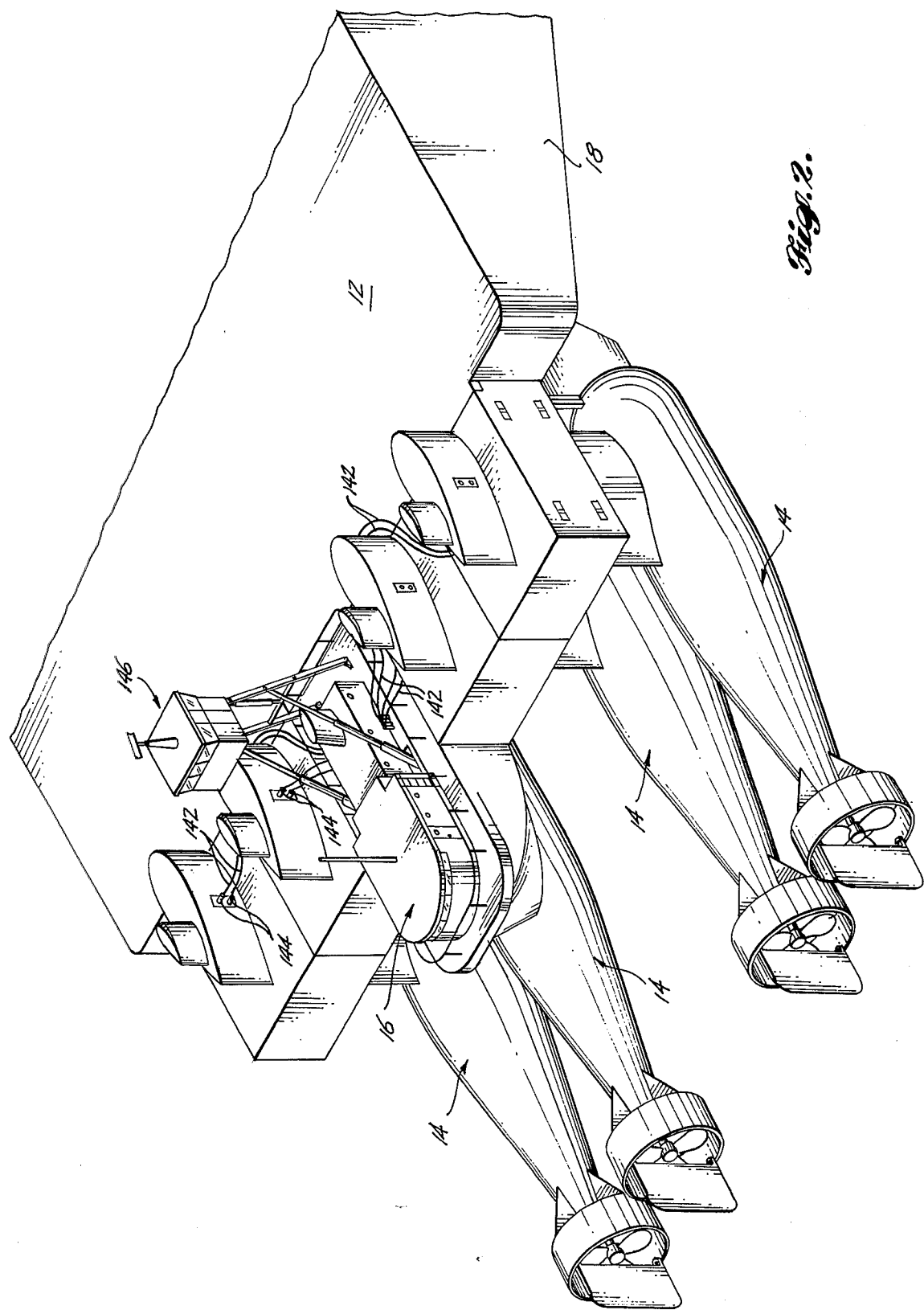

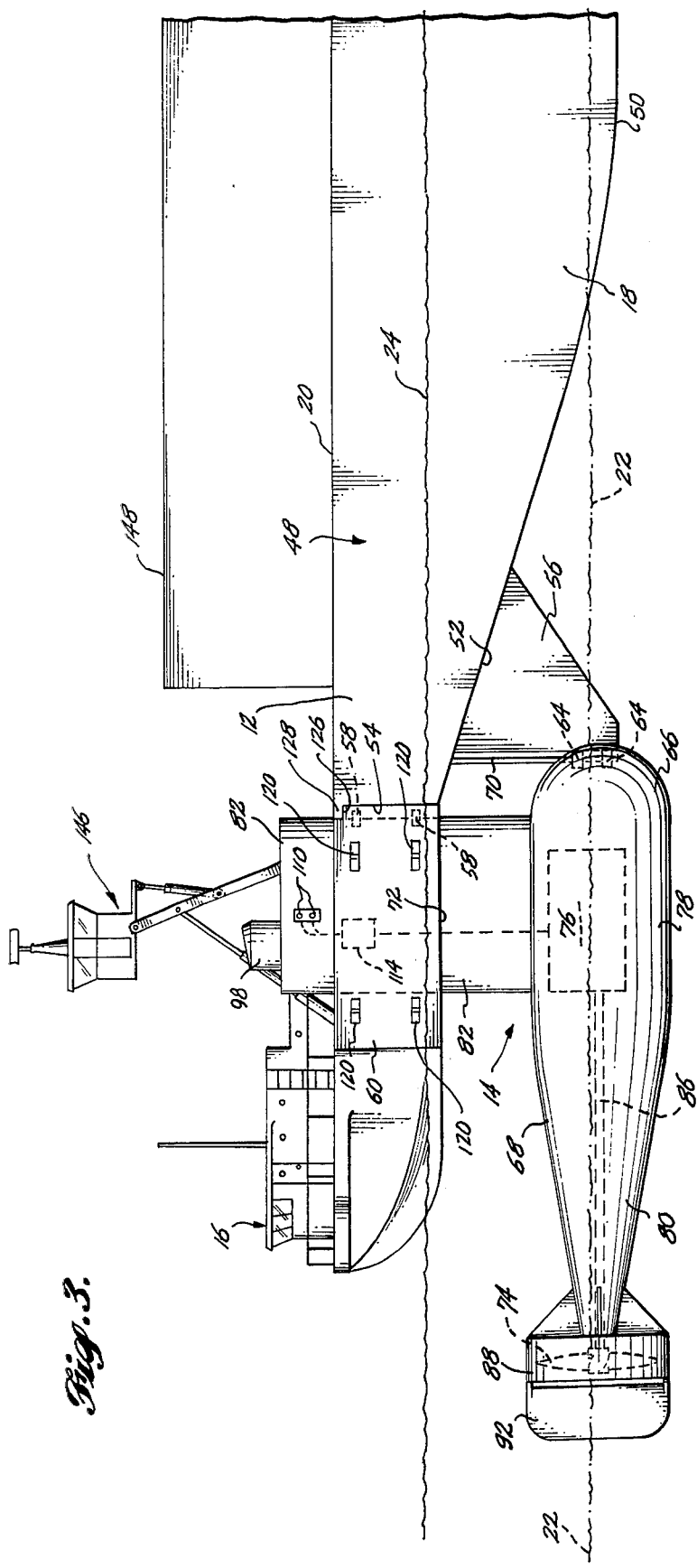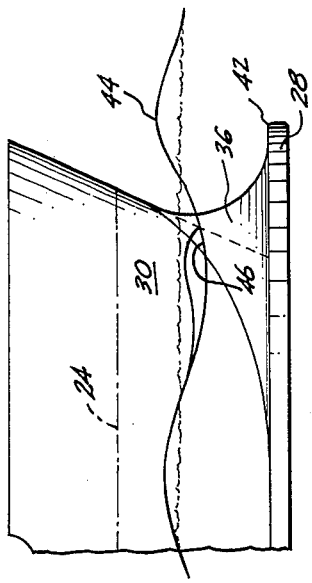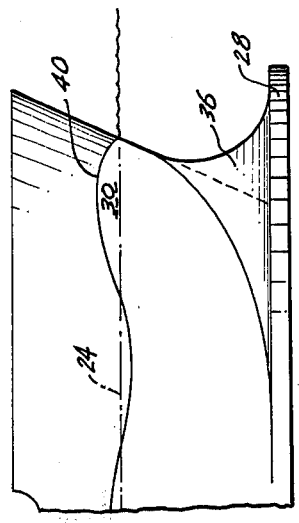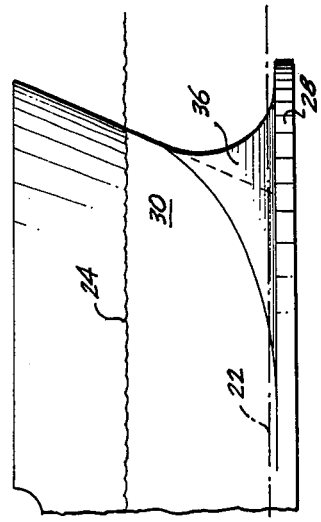

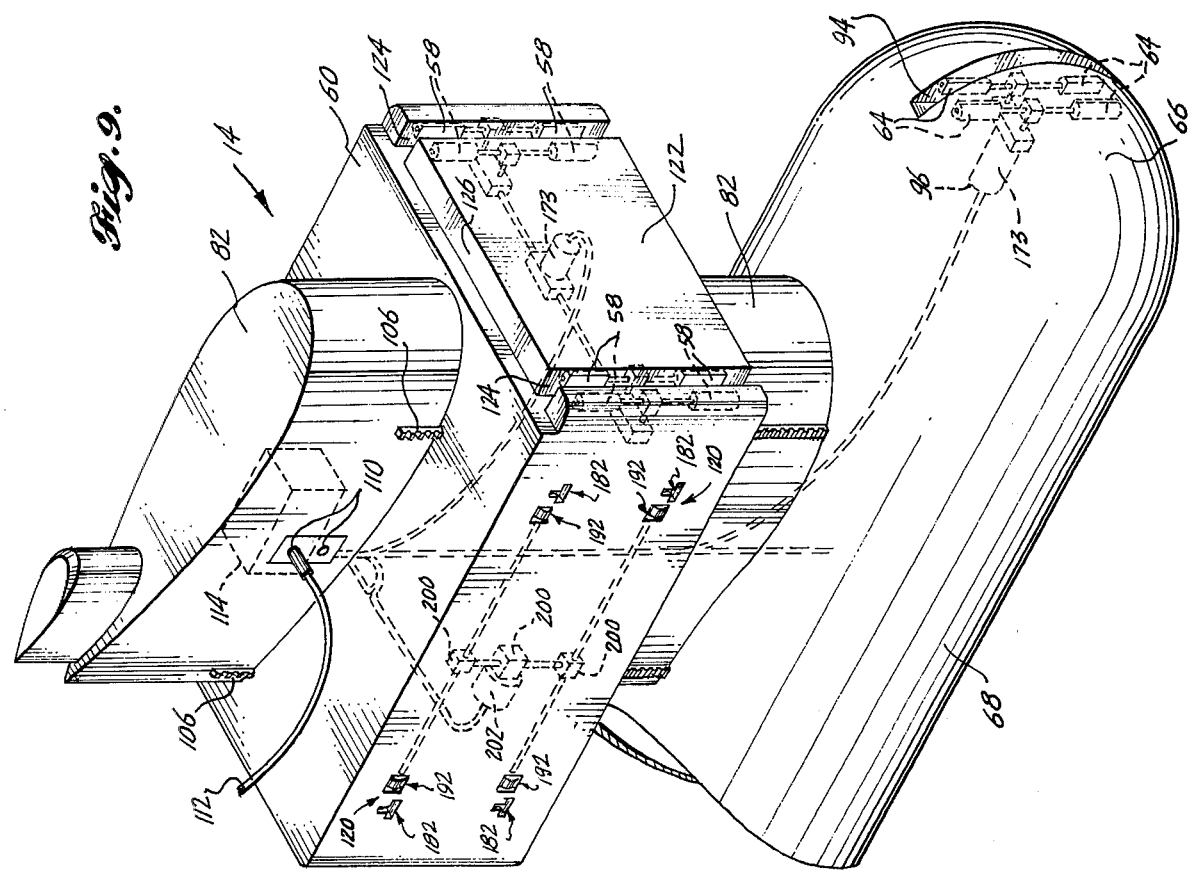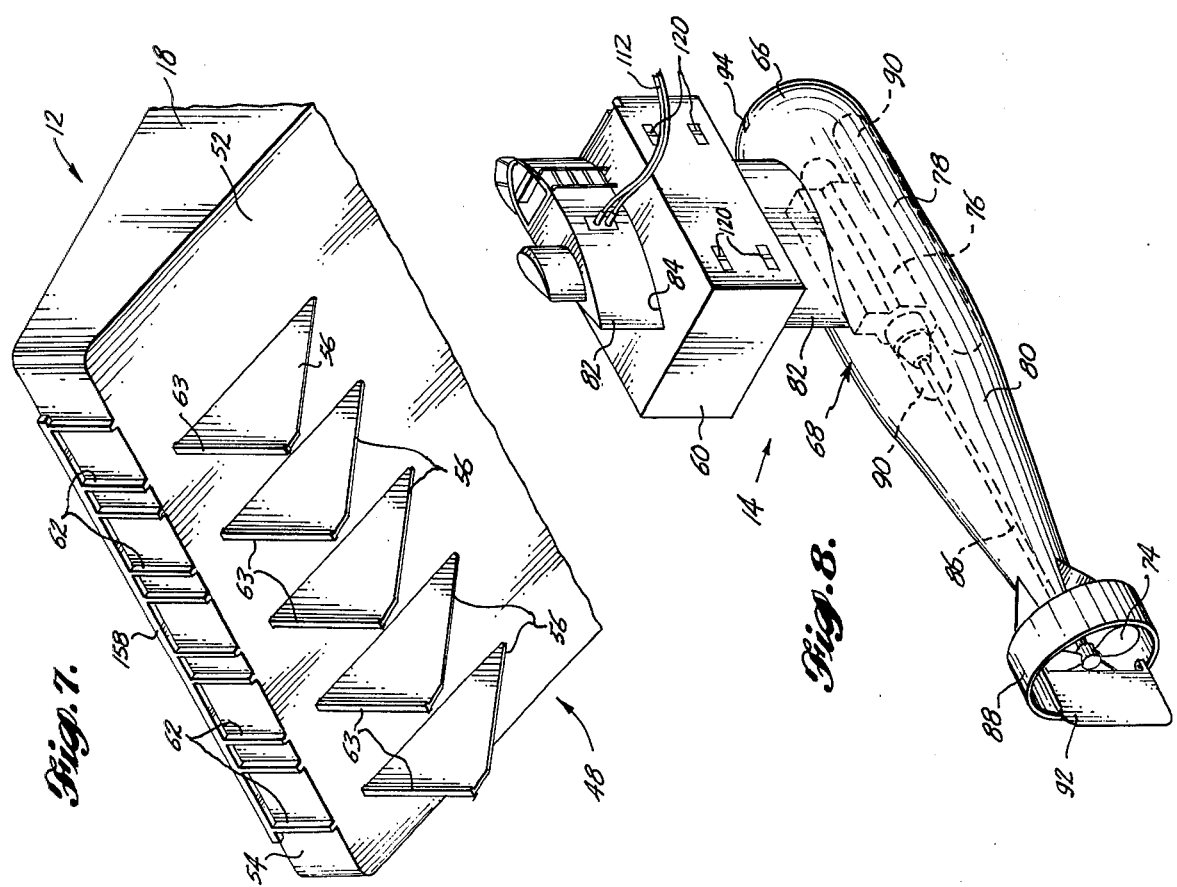

U.S. Patent    Jan. 27, 1976    Sheet 5 of 7    3,934,531
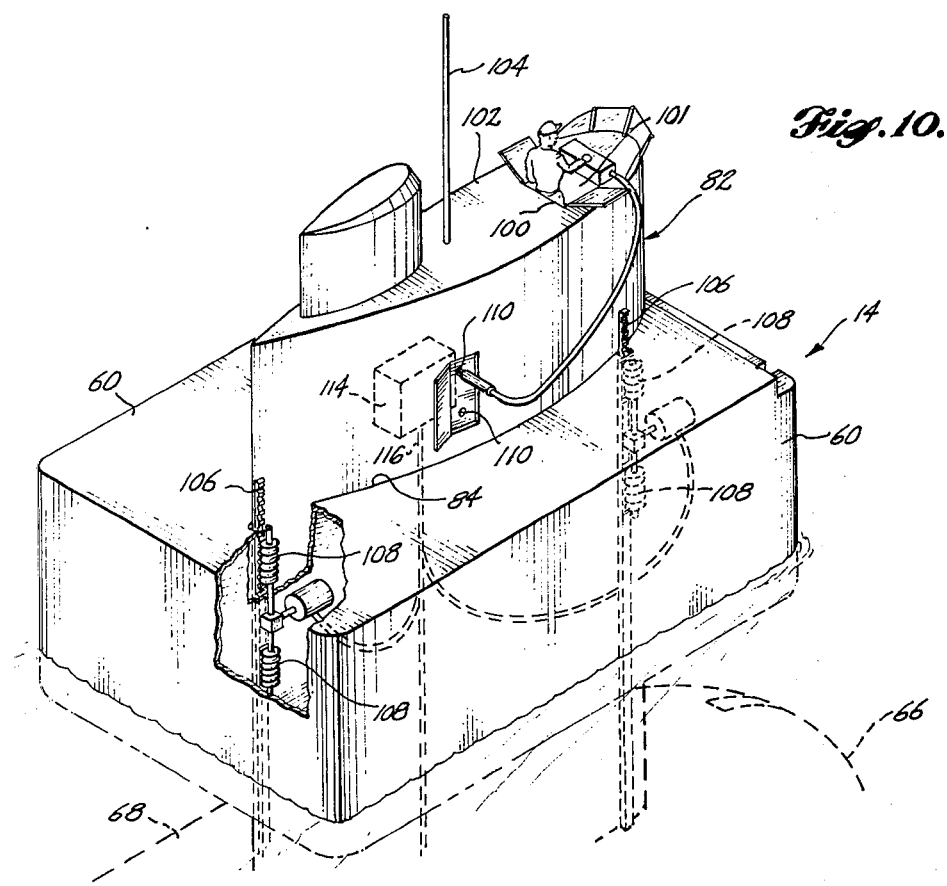
Fig. 10.
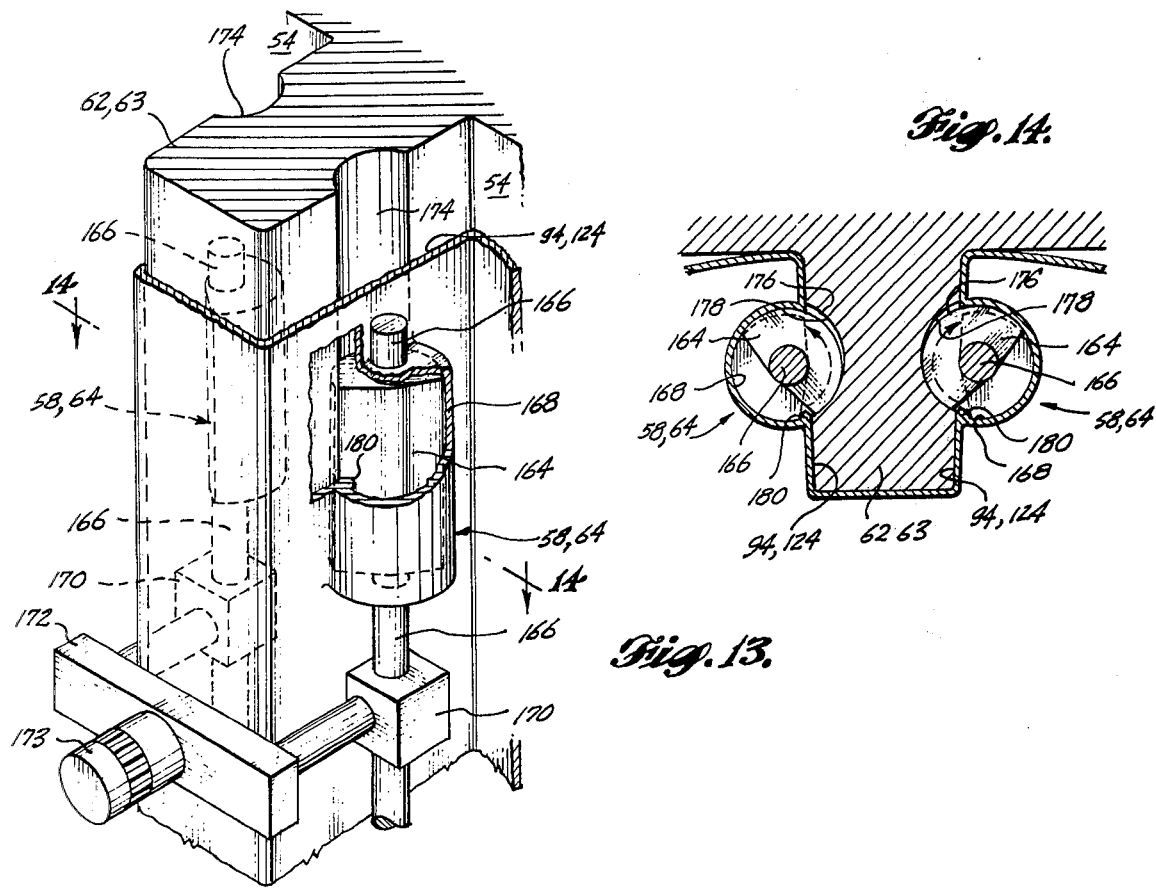
Fig. 13.
Fig. 14.

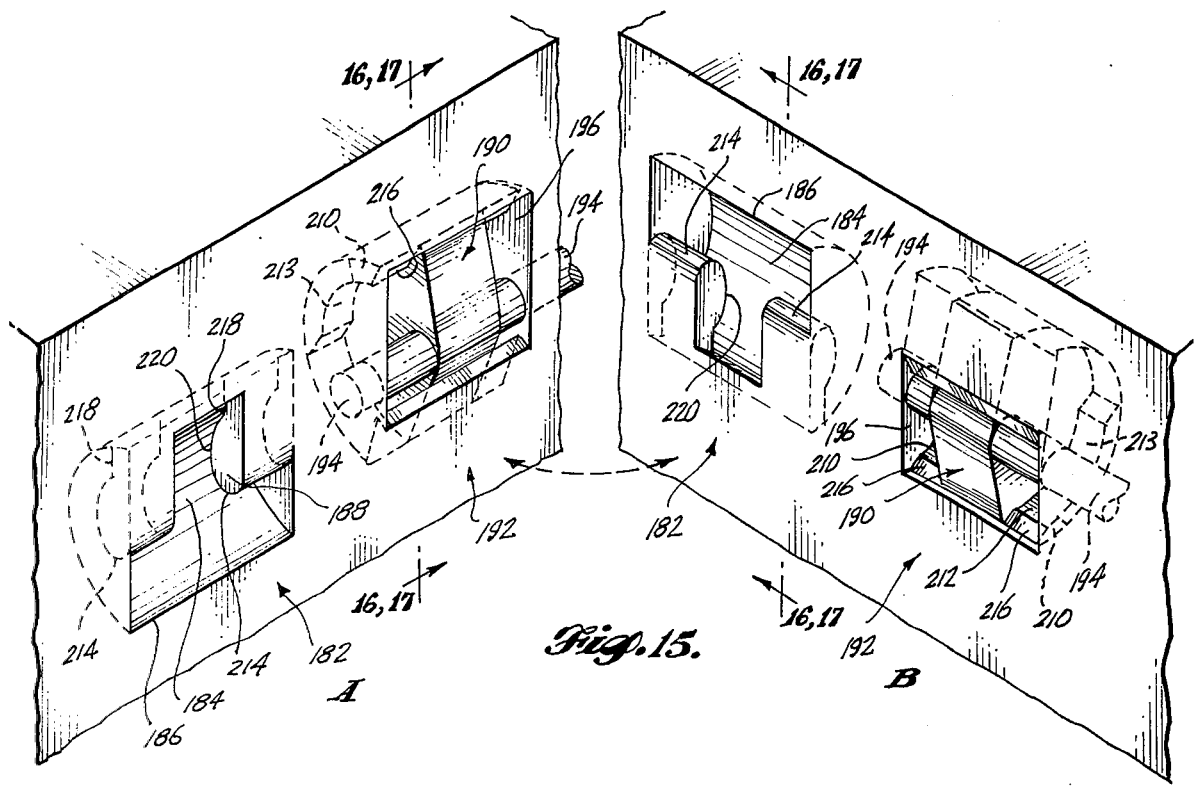
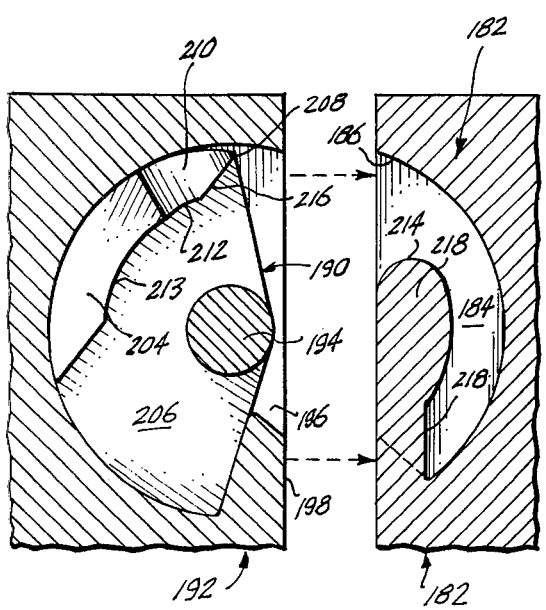
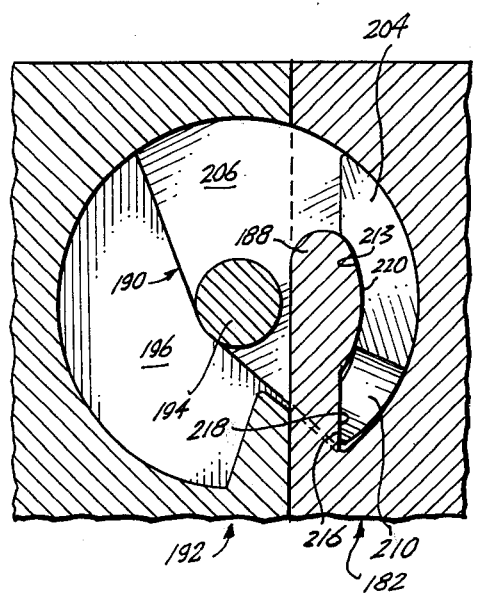

OCEAN GOING CARGO TRANSPORT SYSTEM

BACKGROUND OF THE INVENTION

This invention relates to improvements in ocean going cargo transport systems and more particularly concerns an improved cargo carrier of the type employing a cargo unit vessel and detachable control module and power module vessels. The invention is herein illustratively described by reference to the presently preferred embodiment thereof; however, it will be recognized that certain modifications and changes therein with respect to details may be made without departing from the essential features involved.

It has long been recognized that oceanic cargo ships of conventional design sufficiently large for economic operation on long voyages lose much of those savings in loading and unloading costs and tie-up time; also in the limitation on ports accessible to them, primarily the major deep water ports. Moreover, not only does the typical ship's displacement type hull necessary for efficient safe crossings require an extreme draft for these huge vessels, but the shape and depth of the hull, together with the presence and arrangement of propulsion plants and other ship's machinery, quarters and gear, makes the resulting storage space configurations and arrangements quite ill-suited to the efficient and versatile utilization of the net tonnage hold capacity of the vessel, particularly for general cargo ships as distinguished from tankers wherein storage space configuration is obviously of lesser importance.

A major effort in recent years to reduce loading and unloading costs is seen in the advent of containerized cargo ships and barges. However, with barges, speed is limited and travel time becomes excessive over long distances. Furthermore, a large container ship cannot enter many of the shallow-water ports, so that additional trans-shipping costs are incurred in those cases. Somewhat similar problems are encountered in the large roll-on, roll-off ships such as are used to transport automobiles and the like.

The lighters-aboard-ship type vessels (referred to as LASH) permit servicing of shallow-water ports, such as upriver ports, but again, as in the case of container ships of conventional design, these also are not highly versatile and are incapable of fully utilizing hold space.

All of these ships in the larger sizes are very expensive to build because of the multiple complex curvatures in virtually all portions of a displacement type hull as well as the requirements of complex framing, and providing for the accommodation and mounting of heavy and bulky power plants and other machinery, quarters, and ship's equipment. Moreover the requirements of a large on-board crew to man such vessels not only imposes expensive space and facilities requirements, but also adds operating costs both in terms of wages, fringes and supplies and in terms of lost cargo space otherwise available.

A broad object of the present invention is to devise a high-speed, high-capacity, oceanic cargo carrier of shallow draft configuration readily and efficiently adaptable to substantially any of the specialized or general purpose cargo, container, lighter or tanker vessel applications heretofore utilized. More specifically, it is an object to provide a vessel of such shallow draft yet such relatively large load capacity as will permit the same to navigate in shallow harbors without penalizing its capability of operating safely and efficiently on the high seas.

A further object hereof is to devise an ocean transport system wherein a cargo carrier vessel hull having the desirable box-like or rectangular basis cross-sectional configuration somewhat characteristic of a "barge" is achieved for efficient and versatile utilization of hold and deck space. Yet it will be equipped with such a bow and stern configuration and related propulsion means as to safely attain the high cruising speeds expected of modern ships in trans-oceanic service.

The combinational effect of the general hull configuration having the novel bow form of this invention reduces accumulative pitch and roll tendencies experienced with conventional ship's hulls; also yaw reactions to pitch and roll in quartering seas. Thus held in more nearly level trim laterally in a variety of sea conditions higher cycle loading can be safely permitted. Likewise, because of the decreased pitching tendency and the special bow effects achieved, the improved vessel attains an increased driving efficiency in heavy seas.

It is also an object to devise an ocean going transport system wherein effective utilization of separate propulsion module vessels and control module vessel, detachable from the cargo unit vessel, makes possible use of a smaller crew to man the overall system than with a ship of conventional design and comparable capacity. Moreover, safety of the crew is enhanced by the independent sea-going capability of the detachable power module and control module vessels when decoupled from the cargo unit vessel.

A related objective hereof is to devise an ocean going transport system of the nature indicated which may be of relatively low cost, sturdy construction, yet because of the special bow configuration, capable of withstanding the heavy impact forces of waves and swells on the bow at high cruising speeds. Furthermore, the special bow and stern configurations of the cargo unit vessel hull permits utilizing a flat-bottomed straight vertical-sided midship or waist section over most of the length of the hull, simplifying the lofting framing, plating, jigging and general construction of the overall vessel.

Still another object hereof is to devise an improved transport system with novel control module vessel having a helm station arrangement enabling the helmsman and crew to observe and monitor all parts of the system and to operate from an elevated vantage point with good visibility over the loaded cargo unit vessel ahead of it.

More specific objects relate to a novel and improved construction for the power module vessels, which are to be detachably coupled with the cargo unit vessel to propel the same. Special low cost drive unit, housing and flotation collar arrangements, together with vertical adjustability of the drive units in relation to the cargo vessel hull enables the propulsion line of forces to be raised and lowered and thereby vary the trim of the cargo unit vessel fore and aft for greatest safety and efficiency in cruise. Adjustable couplings between the power module vessels and the cargo unit vessel accommodate or permit such variations in thrust line produced by the propulsion vessel propellers.

BRIEF DESCRIPTION OF THE INVENTION

In accordance with this invention, the substantially flat bottom of the cargo unit vessel which extends across substantially its full width and most of its length, continues into the bow section where it merges with a forwardly projecting cantilevered bottom panel of vessel width. This bow section bottom panel extends forwardly beyond the bow plates and has predetermined thickness and lengths which under normal cruise conditions with the vessel suitably trimmed fore and aft, produces its own "bow wave," the trough of which present in the limited upper "layer" of water severed or sheared off by the bow panel, is presented to the bow plates. As a result of the action of this bottom panel in the bow section of the vessel, forward resistance to motion is minimized and water forces acting on the bow due to wave impact are greatly reduced by the intercepting or shielding effect of the cantilevered bow bottom panel.

As a further feature of the improved cargo unit vessel comprised in the composite cargo transport system of the invention, the substantially flat bottom of the vessel hull is sloped upwardly to the stern end thereof from a location just forwardly thereof and is provided with a series of transversely spaced skegs extending aft to upright terminal edges adjacent the transom. A plurality of power module vessels, each detachably joined to the stern end of the cargo unit vessel hull, preferably have vertically shiftable locking connections with skegs and the transom (or fixed connections on the transom and adjustability within the power module vessel itself). When placed in operative side-by-side relationship abreast across the transom the power module and control module vessels are also interconnected laterally with each other for rigid unitization of the composite.

Further features reside in the novel power module vessels comprising torpedo-like submerged drive units housing engines and propeller and rudder gear and upon the upper side of which is mounted an upright streamlined housing or "sail" extending above water level. A flotation collar structure surrounding and traversed by the sail is adjustable vertically in relation to the sail and thereby permits raising and lowering the drive unit in the water and thereby the fore and aft trim of the cargo vessel hull. The flotation collar structure serves also as a means for supporting locking elements preferably of a rotary cam construction cooperating with mating elements on the adjacent power module vessel collars, the control module vessel and with mating elements on the transom of the cargo unit vessel hull. Similar locking elements on the stern edges of the skegs are engaged by locking elements on the power module drive unit.

Cable connectors and other control umbilicals from the control module vessel to the power module vessels and to the cargo unit vessel enable controlling all of the latter from a central helm station on the control module vessel. The helm station is supported on an elevation platform to raise the crew and with them the various monitor and control devices needed to navigate and control the entire system from a favorable vantage point.

These and other features, objects and advantages of the invention will become more fully evident from the following description thereof by reference to the accompanying drawings.

DESCRIPTION OF THE DRAWINGS

FIG. 1 is an isometric view of the ocean going composite cargo transport of the present invention viewed from a forward location above the cargo unit vessel;

FIG. 2 is an isometric view of the composite cargo transport on a somewhat larger scale than in FIG. 1 and viewed from a location to the rear and above the transport to show the stern portion of the cargo carrier unit vessel with control module vessel and propulsion module vessels detachably coupled thereto;

FIG. 3 is a side elevation view of the stern portion of the composite cargo transport;

FIG. 4 is a front elevation view of the cargo unit vessel illustrating the basically rectangular cross-section of the hull and the bow bottom panel;

FIG. 5 is an enlarged isometric view similar to FIG. 1 showing only the bow portion of the cargo unit vessel;

FIG. 6a is a side elevation view of the bow portion of the cargo vessel depicted in level trim when motionless; FIG. 6b is a similar view with the vessel in trim underway; and FIG. 6c is a similar view with the vessel underway and trimmed bow high, depicting the unique functions of the hydrodynamic bow bottom plate feature;

FIG. 7 is an isometric view of the underside of the cargo unit vessel stern portion as seen from below and aft to one side of the vessel;

FIG. 8 is an isometric view of a single power module vessel of the present invention;

FIG. 9 is an isometric view of a power module vessel as seen from an elevated location forward and off to one side of the vessel, illustrating intervessel locking mechanisms used in coupling the unit vessels together in the composite carrier;

FIG. 10 is a top isometric view of the upper portion of the power module vessel comprising flotation collar and upper said portions;

FIG. 13 is an isometric view of a typical stern-type intervessel locking coupler mechanism mounted on the cargo unit vessel;

FIG. 14 is a cross-sectional view taken on line 14—14 in FIG. 13;

FIG. 15 is an isometric view of the opposing halves of the thwart-type intervessel locking coupler, with sectioning and with its cooperating parts (designated A and B) swung apart for illustrational convenience;

FIG. 16 is a cross-sectional view taken on line 16, 17—16, 17 in FIG. 15 showing the complemental coupler parts as they appear prior to engagement and locking; and FIG. 17 is a similar cross-sectional view showing the coupler parts as they appear in a fully locked state.

DETAILED DESCRIPTION OF PREFERRED EMBODIMENT

Figure 11:
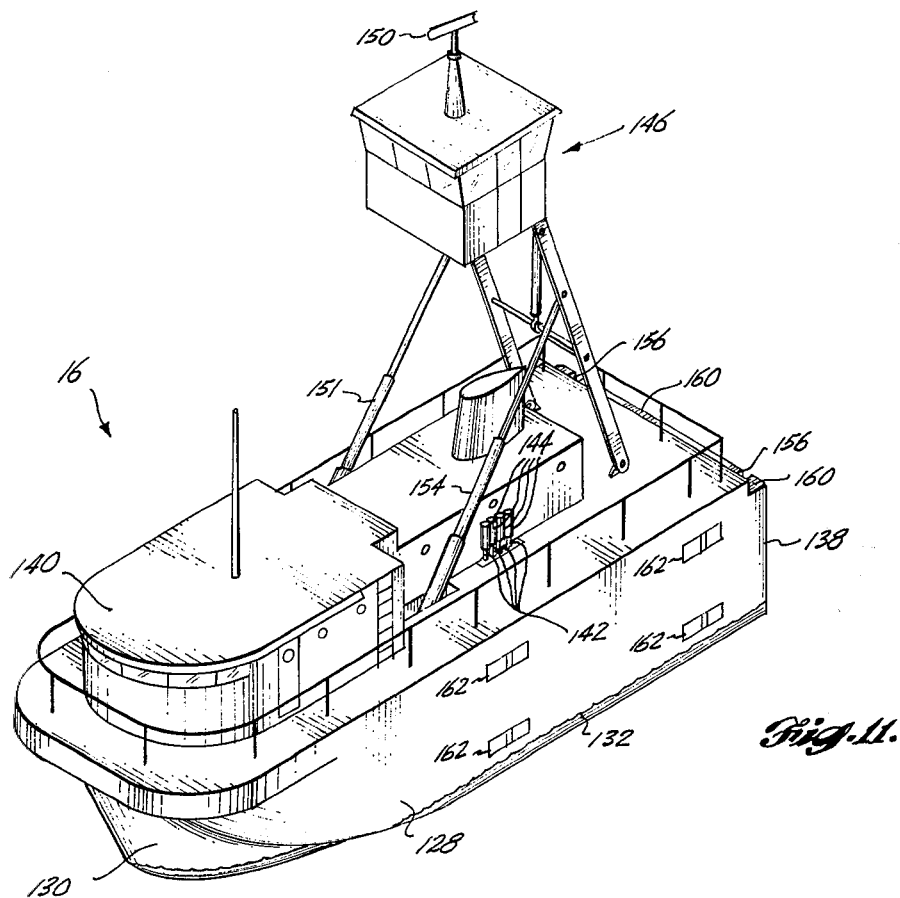
FIG. 11 is a top, forward isometric view of the control modules vessel with its extensible bridge elevated.

As depicted in FIG. 1 the ocean going composite cargo transport 10 comprises three types of interconnected functional elements or unit vessels. These are the cargo unit vessel 12, one or more motor powered propulsion module vessels 14 and a control module vessel 16. The propulsion and control module vessels are detachably coupled to the main cargo unit vessel 12 and to each other in side-by-side relationship. Preferably each is seaworthy of itself as an independent vessel.

The primary system element is the flat-bottomed, shallow-drafted motorless cargo unit vessel 12, differing in nature from but comparable in physical size, displacement and carrying capacity to conventional large merchant ships presently in use. Its unique bow makes possible safely achieving commercially competitive water speeds in heavy seas despite the bluntness of the bow plates and boxiness of the hull over most of its length. Because of its generally rectangular cross-section and uninterrupted interior over most of its length this simple hull configuration makes the vessel relatively inexpensive to produce, gives it a very shallow draft affording access to many ports not safely reached by conventional ships, and in addition, provides maximum efficiently usable cargo hold and deck space uncluttered by engines, crew quarters or superstructure. Moreover, it permits the hull to be adapted and fitted for any conventional merchant carrier cargo loading and storage system applications.

The cargo unit vessel 12 is propelled from the stern by detachable power module vessels 14. These of themselves are preferably independent seaworthy vessels capable of making port and of transporting crew when necessary. Two or more (typically two, four or five) power module vessels are detachably coupled in positions abreast of each other to the stern of the cargo unit vessel as shown in FIGS. 1, 2 and 3. When the power module vessels 14 are locked onto the stern of the vessel 12 they are themselves interlocked by coupling their mutually adjacent sides together so as to make up structurally integral composite units. As with the cargo vessel itself, the power module vessels are of a relative simple low cost design. When decoupled and free to move independently, each can carry the system's crew to and from port and can carry enough provisions (and fuel) for a long sea voyage if necessary in case of emergency. The system thus inherently has a number of "life boats."

The final element of the composite cargo transport system 10 is the detachable control unit vessel 16 which in itself also is capable of operation as an independent seaworthy vessel. It also couples to the stern of the cargo vessel 12 abreast of and preferably between power module vessels with which it is directly coupled so as to become an integral part of the structural composite. The control unit vessel 16 provides the main bridge or control center for mounting and controlling operations of the total system and all of its major parts. In addition to its control and monitor functions, the control unit vessel provides the main crew quarters on ocean passages and with the power module vessels it also can function as a life boat or work boat if the need arises. Optimally, when the power module vessels are connected with the control module vessel, and all are decoupled from the cargo unit vessel, they together can be made to serve as a ship.

Under law and for reasons relating crew size, hence safety, to ships size and types, the present invention having detachable independent power module and control module vessels affords a great degree of back-up safety with all of its requirements met by a very small crew. For example, the control unit vessel 16 may be treated as the only "manned" vessel, defined as a "work boat," which normally need be manned only by a crew of seven to nine. The cargo unit vessel itself, however large, does not demand an independent crew. In effect therefore, a crew of seven to nine will suffice for a transport system of this invention comparable in size, net tonnage and performance to existing merchant vessels that require a crew of 25 to 40 men. This reduction by three-quarters in the number of crew makes more space available for cargo and greatly reduces operating cost. Moreover the crew aboard have more safety and back-up safety facilities than in the conventional ship.

Since the cargo unit vessel is motorless and essentially unmanned (that is, not manned in the conventional sense by onboard crew), space normally taken up by engine rooms, fuel tanks, steering, crew accommodations, stores and other facilities in conventional vessels may be utilized as cargo space. The cargo-carrying midships or waist section is of a constant substantially rectangular cross-section throughout, hence all deck space and hold area is readily organized and fitted to greater advantage for accessibility and storage of cargo. Since virtually all of the hull interior is uninterrupted efficiently shaped cargo space, uncomplicated by complex hull curves and internal equipment common in conventional ships, i.e., revenue producing space, it represents a very high percentage such as 95% of the deadweight tonnage; the ship's total carrying capacity. By comparison, in conventional cargo vessels, net tonnage averages only about 75% of the deadweight tonnage.

The cargo unit vessel 12 of the present invention is also attractive from a production standpoint. The inherently simple physical design void of complex hull curves and unencumbered by costly above-deck superstructure, crew facilities, engines, machinery and ancillary systems yields a vessel that can be produced quickly and at a fraction of the cost of a conventional cargo ship.

Typically the basic hull in the preferred embodiment of the cargo unit vessel is about 635 feet stem-to-stern with a beam of about 105 feet and a hull depth, deck to bottom plates, of about 34 feet. Bow plates are flared 6 to 8 feet above the deckline 20 as shown in FIG. 4. The hull is so proportioned that the no-load waterline 22 describes 3½ feet of draft. The load waterline 24 is 19½ feet above the no-load waterline 22 yielding a 23 foot draft with 11 feet of freeboard in a fully-loaded condition. The waist or midships section of the vessel presents a cargo storage section approximately 450 feet long of a constant 34 foot by 105 foot substantially rectangular cross-section. The bow and stern sections 26 and 48 are each about 100 feet in length.

The midships section of this vessel is or may be of conventional construction requiring no special illustration herein. Typically it will comprise ribs or frames at intervals, joined and held in position by longitudinal beams or stringers. Additional bracing can be provided athwartships and/or running fore and aft depending upon design. Tanks, linear walls, insulation multi-level decking, ramps, cranes, etc. may obviously be incorporated selectively as desired. The skin of the vessel may be conventional steel plating welded to the skeletal frame structure. According to the preferred cargo configuration, full width interior watertight transverse bulkheads are installed at intervals along the length of the hull. These bulkheads further stiffen the hull and divide the cargo space into watertight compartments. Additional hull strength may be gained by attaching interior wall and deck structures directly to the insides of the ribs and tops of the longitudinal stringer beams. Ballast tanks and related valves and pumps (not shown) are preferably laid out inside the double bottom of the vessel as are off and on-loading pumps for tanker applications.

The absence of complex curves prevalent in conventionally designed hulls eliminates the need for commonly required lofting and resulting generation of full-size plans as a prerequisite to construction. The flat-plate right-angle construction of the hull also drastically reduces the costly furnace work required to shape heavy hull plates and in addition simplifies the design and installation of ancillary systems required for the variety of cargo configurations. For the shipbuilder the construction cradle, scaffolding and launching way, normally high outlay items, are vastly simplified due to the flat-bottomed, flat-sided, box-like simplicity of the hull. Additionally the nearly plain rectangular cross-section of the midships hull is ideally suited to the prefabricated construction techniques used in most modern shipyards. Finally, a conventional cargo ship is only 70–90% complete when it is launched and must undergo extensive outfitting thereafter. When the cargo unit vessel of the present invention is launched, however, it is essentially ready to use.

The bow section 26 of the vessel as seen in FIG. 5 may be constructed by conventional ship building techniques. Though unique, it is of simple design which eliminates most of the costly compound curve ribbing and plating inherent in the bow sections of conventional vessels. Its uniqueness derives primarily from its submerged hydrodynamic plate-like bow bottom panel 28 which effectively reduces the bow wave and accompanying drag and protects the otherwise vulnerable blunt bow plates above water to excessive punishment of heavy seas when underway at cruise speeds.

Basically, the bow is formed by singly curved converging side plates 30 (FIG. 5) which fair smoothly aft into the vertical sides 32 of the hull 18. The curved bow plates 30 flare outward and continue above deck level 20 into raised gunwales 34 about the forward periphery of the bow for wave deflection. The lower extremity of the curved bow plates 30 intersect top surfaces of the submerged hollow plate-like panel 28, the under surface of which is substantially coplanar with the flat bottom of the hull 18. A smoothly curved concave fillet or corner fairing 36 extends between the upper surface 38 of the plate-like element 28 and the curved bow plates 30. This stiffens both the bow plates and bottom panel as a cantilevered element.

The three-foot thick, hollow, horizontally disposed plate-like hydrodynamic element 28 of the bow 26 projects forward and laterally from the bow section at the bottom of the vessel. Apart from adding buoyancy because of its hollow form and massive size, this full-width bottom panel has a variable hydrodynamic effect governed by fore and aft trim of the hull. FIGS. 6a and 6b illustrate the vessel trimmed level first motionless then underway with normal bow wave 40 and a predictable area of wetted bow plates 30 with accompanying drag. Under most load conditions when cruising the vessel is trimmed slightly bow high (established by lowering the propulsion vessel drive units) which elevates the forward rim 42 of the plate 28. This is illustrated in FIG. 6c with the vessel trimmed aproximately at 2° bow high. As the vessel is propelled through the water, a pre-bow wave 44 is formed above the elevated forward rim 42 of the plate 28 resulting in a depression 46 in the area of the bow plate fairing 36. The net result is less wetted bow area as the vessel moves through the water, with less water meeting the hull head-on and more flowing smoothly beneath the flat bottom. Thus drag is reduced, permitting a higher cruise speed than would be possible for a flat-bottomed hull of rectangular cross-section equipped with an otherwise conventional bow or with a scow shaped bow. Moreover water impact forces on the bow plates 30 are reduced by the shielding effect of the panel 28, "slicing off" a selected depth of water at the surface that gains access to the bow plates 30.

The stern section 48 of the cargo unit vessel 12, shown to advantage in FIGS. 3 and 7, begins 80–100 feet forward of the stern at a point where the flat bottom 50 of the midships section of the hull 18 rounds into a low-drag shallow incline plane 52, sloping upward toward the transom or stern. The inclined bottom plane 52 intersects the flat, vertical, full-width transom 54 at a point approximately 1½ feet below the load waterline 24. Stabilizer skegs 56 extend downwardly from the inclined bottom plane 52 of the stern section 48 and their vertical trailing edges lie in a common transverse plane at or adjacent the transom.

As will more fully be apparent later herein, the power module vessels 14 connect to the stern section 48 of the cargo vessel 12 via locking coupler mechanism 58 incorporated in their flotation collars 60. These couple to vertical locking rails 62 on the cargo unit vessel transom 54. Additional connections are provided by similar locking coupler mechanisms 64 in the bows 66 of the power module vessels' submerged hulls 68. These couple vertical locking rails 63 on the trailing edges of the skegs 56 beneath the stern 48. The smooth transition from the main horizontal bottom to the inclined bottom 52 of the stern section 48 allows water flowing longitudinally beneath the hull 18 to flow smoothly upward along the incline and between the skegs 56 to the stern where it exits from beneath the hull at the foot of the transom 54. The water is then channeled along the undersurfaces 72 of the power module vessels' flotation collars 60 and along the torpedo-shaped submerged hulls 68 of these power module vessels to their stern screws 74.

Designers of tug boats and work boats in general have traditionally incorporated ship-shaped forms for hulls with bow and stern lines having compound curvature of shell plating. Such forms result in high construction costs whereas straight-framed sections of simple geometric form are much less expensive to construct. The torpedo-like hulls 68 of the power units employed in the power module vessels 14 of the present invention, as shown in FIGS. 3 and 8, generally comprise three assembled shapes each of geometrically simple form and inexpensive construction. Thus each hull 68 housing an engine 76 and other machinery, is comprised of an intermediate cylindrical section 78 which fairs aft into a conical after-section 80 and forwardly into a hemispherical bow section 66, thus forming a torpedo shape. In the illustration, each power unit hull 68 is 16 feet in diameter and 85 feet long. It operates entirely submerged and is of a shape similar to that of modern submarine and has excellent hydrodynamic characteristics. The "sail portion" 82 of the power module vessel 14 rising above the hull 68 is somewhat similar in physical appearance to the conning tower of a submarine but different in function. In the illustration, the sail 82 rises some 28 feet above hull 14, and has a 21 foot fore and aft dimension with a streamlined hydrodynamic shape of constant cross-section at all elevation points. The flotation collar 60, the third and final main component of the power module vessel 68, comprises a rectangular flat-sided box-like structure surrounding and mounted upon the sail 82 intermediate its top and bottom. Measuring approximately 17 feet wide, 25 feet long and 12 feet in overall height in the illustrated case, the flotation collar 60 has a normal draft of 1½ feet. All the edges of the collar are rounded to a constant radius. The central watertight channel 84 in the flotation collar 60 in which the sail 82 resides conforms to the shape of the sail and is also of constant cross-section.

Preferably the hull 68 of the power module vessel 14 houses a single conventional marine engine 76 typically of 3000 to 7,000 h.p. which drives a single shaft 86 and reversible pitch screw 74 which is housed in a tunnel-type cowl 88. The engine 76 may be equipped with conventional transmission and electrical power generation equipment. A battery bank for engine start and emergency electrical operation is also located inside the hull 68 and is maintained in a charged state by the engine generator. Baffled fuel tanks of a capacity to operate the engine at cruise speed for a trans-oceanic passage are situated within the hull 68 with positioning in design dictated by obvious trim and ballast requirements. Longitudinally segmented ballast (and/or flotation) tanks 90 of elongated form are accommodated inside the hull 68 along opposite sides thereof. One or more segments of tanks 90 can be filled or emptied as required to maintain the hull at essentially neutral buoyancy and also to manipulate forward and aft trim of the hull, via a system of control valves and pumps. Steering linkages and related booster equipment for control of the submarine-type rudder 92 are housed in the conical after section 80 of the hull 68.

A set of four intervessel couplings 64, seen in FIGS. 3 and 9, housed in the hemispherical bow section 66 adjacent to a nearly rectangular positioning channel 94 are driven from a single drive mechanism 96 also housed in the bow section 66. The intervessel couplers 64, it should be noted, can be manually operated from within the hull 68 and are normally operated in conjunction with similar intervessel couplers 58 in the forward section of the flotation collar 60. The intervessel bow couplers 64, steering, ballast pumps and valves, bilge pumps and maintenance lighting are powered primarily by the engine generator although they can be operated on an emergency basis from the battery bank.

The sail portion 82 of the power module provides an above-water structure, affords access for crew members to the interior of the hull 68 and supports the flotation collar 60. Access to various systems and equipment within the sail, collar and engine units are provided through watertight hatches and passages, details which require no present description or illustration. The same is true of the many other functional elements employed in the vessel which are or may be of straight forward design. For instance, while not shown, engine exhaust ducting is channeled vertically from the engine compartment in the hull 68 through the sail 82 and is vented through a capped, water-proof funnel 98 mounted on the top of the sail. Likewise ventilation shafts for conducting fresh air to the engine compartment are routed parallel to the access shaft from waterproof ventilators on top of the sail. Fans to drive the ventilation system may be mounted adjacent to the shafts and powered from the engine generator or battery bank.

A watertight hatch 100, seen in FIG. 10, in the forward portion of the upper surfaces 102 of the sail 82 provides access to a conning station 101 which is utilized when the power module vessel 14 is operated as an independent vessel. The upper surface of the sail also mounts navigation lights as required under Maritime Law for independent operation and a utility mast 104 (which can be of a plug-in type) for lights and signals.

Vertically oriented gear-tooth racks 106 mounted in three, four, or more locations on the sides of the sail 82 function to engage power-driven pinions 108 in the flotation collar 60. The racks form part of a system housed primarily in the collar which provides a mechanical means for adjusting the position of the collar 60 in elevation relative to the sail 82. This system will be discussed in more detail later herein.

Umbilical cable plug-in connectors 110 mounted in the side walls of sail 82 are adapted to couple with mating connectors of the control and monitor umbilical cables 112 from the control module vessel 16. It is through these cables and connectors that personnel aboard the control module vessel 16 are able to monitor and control all systems and functions within the individual power module vessels 14. An obvious alternate method of interconnecting the control module vessel 16 with the power module vessels 14 is to provide busses connected to the control module vessel and extending across the stern of the cargo vessel 12. These are topped by umbilical cable connections from the individual power module vessels. This latter type of umbilical arrangement has advantages in a composite cargo transport system configuration in which the control module vessel 16 is replaced by a fifth power module vessel and control of all the power modules is achieved through the use of a portable control console operated aboard one power module.

Inside the sail 82 the umbilical connectors 110 are connected directly to a junction box 114, seen clearly in FIGS. 3, 9 and 10 which distributes control singals received from the control module vessel 16 to systems throughout the power module 14. At the same time, the junction box 114 receives monitor signals from power module systems and transmits them through the umbilical 112 to the control module vessel. The main signal channel within the sail is a branched cable bundle 116 which extends from the junction box 114 to various systems and mechanisms in the sail 82, flotation collar 60, and hull 68.

The foregoing description assumes that the control or monitor signals are channeled through an umbilical to and from a control vessel 16. It should be noted, however, that the power module vessel 14 is capable of operation as an independent vessel. In this mode, the sealed conning station 101 on the top of the sail 82 is activated by a portable, suitcase-type plug-in control and monitor unit 118. The control and monitor unit 118 plugs into the sail umbilical connector 110 as shown in the FIG. 10 or to a connector within the conning station itself which is in turn linked directly to the junction box 114. Signals to control the power module vessel thus originate at the conning station within the sail. The junction box routes necessary monitor signals to the portable suitcase unit for display. The portable suitcase unit has a definite advantage in that it eliminates the necessity of installing costly control and monitor circuits and devices in all of the power modules. A single suitcase module can be used with many power module vessels since the power modules are normally operated independently only in port for short runs to switch from one cargo vessel to another.

The box-like flotation collar 60 of the power module vessel 14 supports and stabilizes the hull in the water by maintaining the vertical orientation of the sail 82 which is slidably mounted in a central vertical channel 84 in the collar. In addition to its stabilizing function, the flotation collar provides the means of interlocking the modular vessels of the system. Sets of cam-type intervessel couplers 120, FIGS. 3, 8 and 9, housed on each side of the collar 60 facilitate the interconnection of each power module vessel with the flotation collars of adjacent power module vessels and/or the side of the control module vessel 16. Two additional sets of cam-type locks 58 are housed in the forward face 122 of the flotation collar 82 adjacent to two vertical positioning channels 124. These forward intervessel lock sets working in conjunction with the locks 64 of similar type housed in the hemispherical bow section 66 of the hull 68 permit the power module 14 to be firmly connected to the stern of the cargo vessel 12. A recess 126 running along the upper forward edge of the collar 60 forms an abutment which engages the ledge-like stop 128 on the stern 48 of the cargo vessel 12 which holds the two vessels in the proper relative vertical position when the locks are activated. All of the intervessel locks in the flotation collar are driven by mechanisms housed in the collar and powered via a floating cable from the junction box 114 in the sail 82. The locks can be selectively remote-controlled from the control vessel 16, power module portable controls, or via manual crank or lever-type mechanical means through access ports in the deck of the flotation collar.

The deck area of the flotation collar 60 provides those fixtures which are required to operate the power module 14 as a sea-going vessel.

In addition to the intervessel locking system, the flotation collar 60 also houses automatic bilge pumps, maintenance lighting, ballast tanks with associated control valves and pumps and a system for mechanically changing the vertical position of the collar 60 on the sail 82. This latter system consists of power-driven pinions 108 (FIG. 10) in engagement with the previously described racks 106 mounted on the sides of the sail 82. The system functions to compensate for changes in relative buoyancy between the collar and the sail/hull assembly resulting from consumption of fuel, changes in hull and collar ballasts and intake of water to the hull and collar bilges. The capability of physically changing the relative vertical position of the collar on the sail is additionally necessary when the power module 14 is attached to the cargo vessel 12 to compensate for changes in cargo vessel longitudinal trim. The adjustment feature is also valuable to some extent in compensating for sea conditions during independent operations of the module and to facilitate the alignment and engagement of intervessel locks with mating mechanisms on adjoining vessels.

The flotation collar 60 as heretofore described is primarily a functional, mechanical assembly containing basic operating systems. In such a configuration it is desirable that unused space within the collar be compartmented and fitted with flotation material such as unicellular foam. Another embodiment of the flotation collar must be considered, however, which would meet the requirements of another operating mode of the cargo system. That mode being short haul operation in which a minimum of crew accommodations are required, such as coastwise navigation, allowing the control vessel 16 to be replaced by a fifth power module to increase the water speed of the system. In this configuration, one or more of the flotation collars on the power modules can be outfitted on the interior with minimum crew accommodations accessible from the deck through watertight hatches.

The control module vessel 16 is a self-contained module also capable of independent self-propelled operation, yet its primary intended use is that of being connected to the cargo unit vessel of this invention, as shown in FIGS. 1, 2 and 3, to provide overall control of the cargo transport system 10. The central feature of the control vessel is a control and monitor complex through which it functions as the modulized bridge of a merchant ship. In this capacity the control vessel 16 directs and operates the unmanned, motorless cargo vessel 12 and the attached power modules 14 as an ocean going cargo system comparable in capability and function to a large conventional merchant ship.

Figure 12:
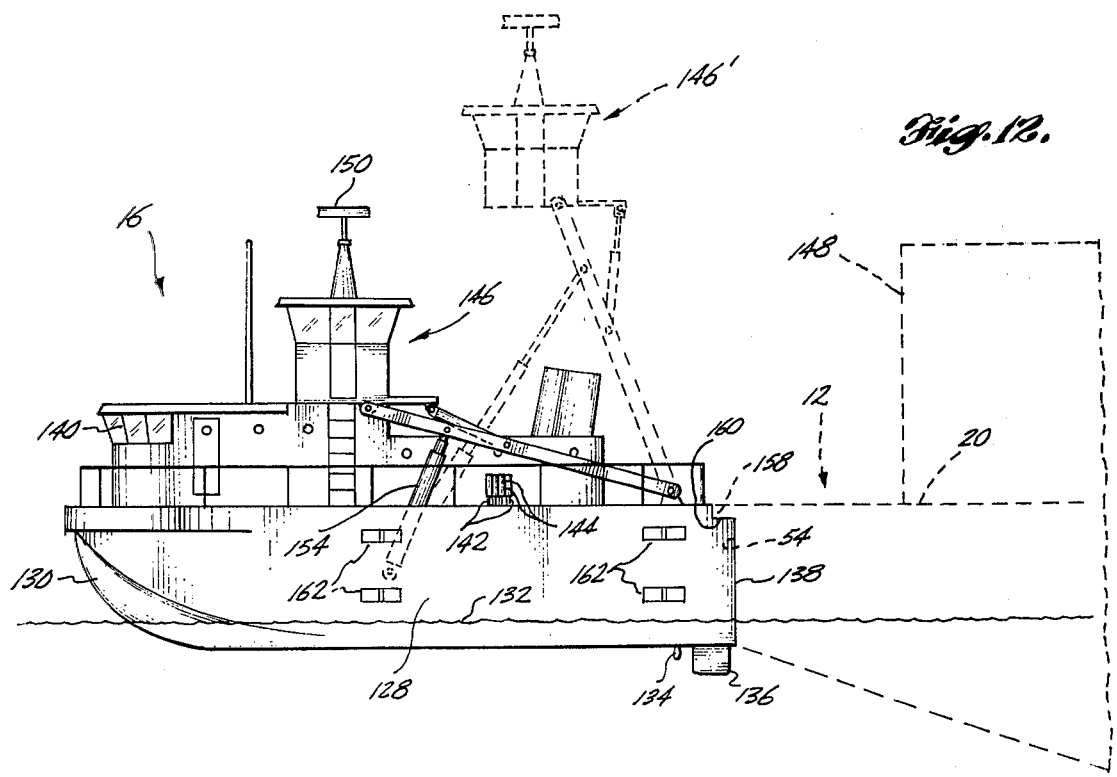
FIG. 12 is a side elevation view of the control module vessel showing the extensible bridge in dotted lines elevated and in solid lines lowered in the stowed position.

The hull 128, shown to advantage in FIGS. 11 and 12, of the control module vessel is of simple flat-bottomed, flat-sided design with a simple contoured bow 130. In the example it is 42 feet long with an 18 foot beam. It should be noted that the power plant in the control module vessel 16 driving screw 134 is not intended to contribute motive power to the cargo unit vessel 12 but only to provide propulsion for its own independent operation. Underway as an integral cargo system element, the control vessel receives electrical operating power from the generators aboard one or more of the power modules 14.

The umbilical cables 142 which interconnect the vessels of the composite cargo transport are, in the preferred embodiment, integrally connected to and housed in the control vessel. They can be reel-mounted or coiled below decks to provide protected storage and facilitate extension to the other vessels of the cargo system, as specifically shown in FIG. 2, through watertight apertures. Cable connectors 144 can be of the capped waterproof type and deck stowed. The cables connect within the control vessel to a master junction box (not shown) which appropriately routes control and monitor signals.

Control module vessel 16 has an elevatable bridge assembly 146 which provides good visibility to its operators at least comparable to the bridge of a conventional merchant ship. Extension of bridge 146 from its stowed position atop the cabin 152 is affected by hydraulic actuators 154.

For physical connection to the cargo vessel 12, the flat stern plates 138 of the control module vessel interface with the flat vertical transom 54 of the cargo unit vessel 12. Spaced coupling rails 62 (FIG. 7) mounted vertically on the transom mate with correspondingly spaced vertical channels 156 on the stern 138 of the control module vessel 16. Two massive rotative locking cams in each stern channel 156 are driven by an electrical or hydraulically powered mechanism to firmly engage locking grooves on the cargo vessel locking rails 62. A ledge-like overhang 158 at the upper edge of the cargo vessel transom 54 functions as a stop to limit the vertical travel of the cargo unit vessel's stern on the locking rails. When the cargo unit and control module vessels are properly positioned and locked together the ledge-like stop 158 is received in a complemented thwart-running channel 160 on the stern of the control vessel.

Thus the control module and cargo unit vessels are firmly locked together and essentially become a single unit until separated at the end of the voyage. As in the case of the power module vessel couplings, the locking mechanisms are sufficiently strong and so designed that once interlocked, even heavy seas will not cause relative movement between the two vessels. All the modulized units thus attached to the cargo vessel are then interconnected laterally, that is, with adjacent units to form a single rigid structure which effectively becomes part of the cargo vessel and forms the system of this invention. Thwart ship intervessel locks 162 mounted in the sides of the control module vessel and anchored deep in its hull are identical to those in a flotation collars 60 of the power modules 14. They are arranged in patterns on both sides of the hull 128 so as to mate with corresponding port and starboard power module vessel locks. Ideally, four of the massive cam-type locks are situated at each interface. All of the intervessel locks aboard the control vessel, those on the sides and those on the stern, are electrically or hydraulically powered for remote control from the bridge or by on-deck manual crank or lever operation. A detailed description of the intervessel locks is provided later in this text.

The control vessel 16 via umbilical cables provides system control signals through which the control vessel can individually or synchronously operate the engines, transmissions and steering of the power modules propelling the cargo vessel. A typical example of synchronous control is the generation of a single steering signal for control of the steering systems aboard all the power modules to operate their individual rudders 92 in unison. Power module system functions under the direct influence of the control vessel bridge complex include: engine start and stop, engine throttle, engine transmission mode, steering direction, electrical generation and storage system operation, ballast system pumps and valves, bilge pumps, and selective control of intervessel locks.

Semi-cylindrical cam couplers or locks of the type illustrated in FIGS. 9, 13 and 14 are housed in the stern of the control vessel 16, in the forward face 122 of the power module flotation collar 60 and in the hemispherical bow section 66 of the power module vessel hull 68. These locks, each with complemental parts 58 and 64, are used to secure the detachable control module vessel and power module vessels of the system to the stern section of the cargo vessel 12. For the purposes of this description, these locks 58 and 64 shall be called stern locks. The other cam-type couplers or locks employed in the system shown in FIGS. 9, 15, 16 and 17 are termed thwart locks since they laterally interconnect the power module vessels 14 and control module vessel 16 once they are attached to the cargo vessel's stern section 48. The thwart locks employ disc-like cams.

Stern locks 58 and 64 comprise semi-cylindrical cams 164 mounted on rotatable shafts 166 within recesses 168 on either side of a positioning channel 94 and 124 in the vessel structure. Rotatable shafts 166 are driven through gearing 170 and 172 by an electric or hydraulic motor unit 173.

The positioning channels 156 (FIG. 11) housing the locks on the control module vessel stern 138, and the positioning channels 124 in the forward faces 122 of the power module flotation collars 60 receive the vertical locking rails 62 (FIG. 7) on the transom 54 of the cargo vessel stern section 48. The positioning channels 94 in the bows of the power module hulls 68 receive locking rails 63 on the trailing edges of the skegs 56 mounted on the inclined bottom 52 of the cargo vessel stern section 48. All of the locking rails 62 and 63 are sculptured on either side with vertically running rounded grooves 174 (FIGS. 13 and 14). When the vessels are brought together in positional registry the semi-cylindrical cams 164 of the locks housed in the recesses 168 on either side of the positioning channels 94 and 124 are made to rotate on shafts 166 into the grooves 174 in the locking rails 62 and 63 to effect the locking engagement. As shown in FIG. 14, the openings of the cam recesses 168 and the locking rail grooves 174 are relatively offset and the cams 164 are mounted eccentrically. Thus as a cam 164 is rotated into a groove 174 its outer curved surface 176 engages the interior surface 178 of the groove 174 such that the farther it is rotated in a locking direction, the tighter it wedges and tends to force the vessels closer together. The flange 180 on the innermost edge of the opening of the cam recess 168 operates as a two-way stop. It prevents overdriving cam 164 when locking, and stops the cam 164 when disengaging the lock in a position that will note interference with separation of the locking rails 62 and 63 from the positioning channels 94, 124.

In the preferred embodiment, sets of four thwart lock components 120 (FIG. 9), 162 (FIG. 11) are installed on each side of the power module flotation collar 60 and on each side of the control vessel hull 128. The four components in a set are arranged in a complemental matching pattern such that the starboard side lock component of any power module vessel or the control module vessel will couple with the lock components on the port side of any other such vessel. In FIG. 9 the thwart lock devices shown are representative of the lock arrangement on both sides of the flotation collars 60 and on both sides of the control vessel hull 128. As with the stern locks, the thwart locks can be selectively controlled either from the control vessel 16 or by portable control from a power module 14. Manual operation of the locks is also possible by mechanical crank or lever means through on-deck access ports.

The female or socket component 182 of each lock, shown in FIGS. 9, 15, 16 and 17, has a curved recess 184 with an entrance 186. The recess 184 lying behind protrusions 188, receives the semi-circular disc cam 190 of the complemental lock component 192. The cam 190 is mounted on a rotatable shaft 194 in a recess 196 in the side 198 of the vessel. The shaft 194 is driven through a gearing 200 by an electric or hydraulic motor unit 202. The cam disc 190 includes raised members 204 on each side of the central disc portion 206 which, when the lock halves 182 and 192 are aligned and positioned face to face, are rotated into the female recess 184 behind the protrusions or shoulders 188, thereby effecting locking engagement. Note that the leading edge portion 208 of both raised members 204 of the cam 190, that portion that enters the female recess 184 first, has a chamfered area 210 on its top surface and another chamfer 212 on its inside curved surface 213. These chamfers on the raised members 204, along with the acute rounding 214 of the ends of the retaining fixtures 188 of the female lock half 182 insure that the cam 190 will easily enter and rotate into the recess 184. The cam and recess are engineered for tight fit, however, and as the end surfaces 216 of the raised members 204 abut the limiting surfaces 218 inside the recess 184, the concave inside surfaces 213 of the raised members 204 wedge tightly against the convex inside surfaces 220 of the retaining fixtures 188. Thus, the two detachable elements of the systems are locked together laterally.

The previously described cargo unit vessel 12 provides a hull 18 which can be adapted to any of the variety of merchant ship configurations. Power for the onboard systems for almost any configuration to which the hull 18 is adapted can be supplied by an onboard diesel auxiliary power unit or by umbilicals from the control vessel 16 or a power module 14, or both. Some systems require only dockside power for on and off-loading operations such as for power doors and hatches, elevators, winches, derricks and cranes. Onboard lighting, ballast, and bilge pumping systems and seawater fire extinguishing systems are of conventional type and can be modified and adapted to meet any of these requirements. Any conventional stabilizing system to reduce rolling at sea, such as of the underwater fin type, can be adapted to the hull. Likewise, in-hull underwater thrusters (sides, bow and stern, if desired) for tight maneuvering can be adapted with or without the power module vessels operative. Navigation lighting and ondeck hardware for mooring and securing purposes can be of any standard type.

The traditional general cargo ship has been and still is the most common merchant ship configuration. It is used to carry package goods and freight, that is, items that are contained in packages of all sizes or that form a package in themselves. This ship configuration is characterized by individual compartments or holds with a separate hatch over each. Cranes or derricks mounted on the deck between the holds are used for on and off-loading. Among it applications, the cargo unit vessel 18 of this invention, having a constant rectangular cross-section between the bow and stern sections 26 and 48 respectively, is ideal for general cargo ship application. Watertight bulkheads spaced at intervals along the length of the hull divide the cargo area into a series of identical perfectly rectangular holds in which there is no lost space due to curvature or incline of the hull. Loading and unloading operations are unhampered by above-deck superstructures. Hatches, winches, cranes, and derricks are powered from an onboard auxiliary power unit, dockside power, or from a power module by umbilical.

Traditional general cargo ships as just described are declining in use, however, due to high operating costs resulting from the time and labor required to load and unload a mixture of items of varying shapes and sizes. They are being replaced by container ships which are specially designed to carry standard 8 foot × 8 foot × 20 foot or 8 foot × 8 foot × 40 foot cargo containers. The container ship is extremely economical to operate since it requires only a few men, a short time to on and off-load using power equipment specifically designed to handle standard size cargo containers. In a container ship, the individual hatches and holds and the derricks which service them are eliminated. The container ship hull is simply an enormous warehouse divided into cells by vertical guide rails within which the cargo containers are stacked. Since the cargo containers are rectangular, their adaptation to the perfectly rectangular cargo section of the hull of the present invention is a simple matter. The containers can even be stacked more efficiently than in the conventional container ship since there is no space lost due to hull curvature or incline. Since most port facilities as common practice on and off-load container ships using giant dockside cranes, virtually no powered onboard systems for on and off-loading are required in this hull configuration.

Deep-drafted container ships presently in operation are nominally 700 feet long, do about 22 knots, carry a crew of 25 and transport approximately 1,200, 20-foot containers at one time. A composite cargo transport of the present invention in a container ship configuration, in the 635 foot by 105 foot by 34 foot hull embodiment of the cargo unit vessel, will comfortably carry 1,380 20-foot containers (23 long by 10 wide stacked 6 deep). It will operate efficiently at speeds in excess of 20 knots and with a crew of just seven. Moreover it will safely move into extremely shallow ports. The economic benefits will be evident.

Another type of cargo vessel to which the cargo hull of the present invention is ideally adapted is the roll-on, roll-off ship configuration. Like the container ship the cargo is unitized, that is, is made up of individual cargo packages or containers of relatively standard size. The roll-on, roll-off ship receives such cargo unit containers mounted on wheels, motor vehicles or any other cargo that can be rolled aboard. The roll-on cargo unit is driven aboard or on-loaded through side or stern openings and then by way of ramps and elevators to assigned places on higher or lower decks. Most common of the roll-on, roll-off ships are automobile carriers.

The interior of the roll-on, roll-off ship hull is divided into a number of deck levels interconnected by ramps and elevators. The uninterrupted rectangular box shape of the cargo unit vessel hull of the present invention lends itself ideally to this adaptation since decks, ramps, elevators, and support systems can be fitted with less cutting and fitting than is required in a conventionally contoured ship's hull. The cargo vessel hull size specified in the preferred embodiment of the invention described herein provides speed and carrying capacity more than comparable to existing roll-on, roll-off ships of slightly larger size (nominally 700 feet in length).

LASH [or Lighters (barges) Aboard Ship] vessels are very similar in concept to the container ships in that the 60-foot lighters are stacked within the hull in layers to a height above the deck. The lighters are normally loaded at upriver ports with any kind of cargo and then towed downriver by tug to the seaport where they are lifted aboard the LASH ship as a cargo container. LASH ships normally unload in river ports from which their lighters are towed upriver. However, the relatively shallow draft of the cargo unit vessel of the present invention lends itself ideally to the shallow-water river operations replacing the need for special LASH type merchant carriers.

The uninterrupted box-like simplicity of the hull 18 of the cargo unit vessel 12 also lends itself for adaptation to the entire spectrum of uses for conventional merchant ships classed as bulk carriers. These include dry bulk carriers which transport ore, grain, fertilizer or any cargo that can be piled loose into a hold; the O/O carriers which haul either ore or oil; and the O/B/O ships which haul ore, light bulk cargo such as grain or fertilizer, or oil. These vessels are simply large cargo containers and require a minimum of onboard powered systems or complex hardware. On-loading and off-loading of these vessels is normally accomplished using dockside equipment and power.

Just as the improved transport of the invention is readily adapted to most merchant ship applications, it is also readily adapted to applications to carry petroleum products or any other liquid cargo such as liquid natural gas, molasses, vegetable oils and wines. Tanker hulls are divided into giant tank cells with elaborate plumbing for on and off-loading and inter-tank transfer. In conventional petroleum and natural gas tankers the superstructure and engine room is set far aft to reduce the danger of fire and explosions. From this it can be seen that the detachable remote power modules of the present invention are ideal for tankers designed to carry flammable and explosive cargoes. The tanker version of the cargo vessel of this invention requires virtually no powered systems relative to cargo on and off-loading or transfer.

No configuration or commercial vessel has undergone more change in recent years than the tanker which in its most prominent role carries crude oil. Technological changes have been significant, however, these have been overshadowed by changes in size; from large to gargantuan. The tremendous size of the supertankers has dramatically reduced the cost of shipping petroleum and revolutionized shipbuilding concepts.

Modern supertankers are typically 1,100 feet long, 175 feet wide, 105 feet deck to keel with a 70–80 foot draft. The vessels can carry 375,000 tons of crude oil and their problems are commensurate in magnitude with their enormous size. Among the most prominent of these problems is the cost of producing one unit one-fifth of a mile long with engines developing 40,000 horsepower, dozens of complex ancillary systems and accommodations for a crew of 40. Its exaggerated draft bars it from virtually every existing port in the world and necessitates the development of deepwater pumping anchorages miles at sea. It takes the engines over an hour at full power to push the loaded vessel to its 15 knot cruise speed at which it produces a 12 foot drag-producing bow wave. It takes 23 minutes and 3 miles with the engines in full reverse to bring the same loaded vessel to a complete stop, and maneuverability is virtually nonexistent. It takes a 20,000 gallons per minute pumping rate with back-up seawater ballast pumping, both controlled by a computer which monitors internal hull stresses, more than 4 days of nonstop pumping to on or off-load the vessel while its machinery and crew stand idle. And last but certainly not least, the specter of ecological disaster sails with each supertanker.

A cargo hull of the type described by the present invention, sized and configured as a shallow-drafted supertanker, would be somewhat less expensive to build than its conventional counterpart due to the elimination of engines, full tanks, steering, crew accommodations and many complex systems. The vessel would be powered by the standard sized detachable power module vessels 14 described herein. Six of the modules would generate 42,000 horsepower, more than adequate power for the vessel according to existing supertanker requirements. In tight maneuvering situations one or more of the power modules can be detached and reattached along the hull to act as thrusters. As previously noted, detachable power modules vessels external to the vessel's hull are a particularly desirable feature in a tanker configuration where the danger of fire and explosion is more prevalent than in any other type of vessel.

The control vessel for the supertanker would of necessity be of unique design incorporation not only control and monitor systems for the power modules, but also all of the unique systems functionally required for the operation of a tanker-type vessel of super size. The control vessel would be umbilically linked to the tanker and would computer monitor the internal hull stresses present when carrying great loads. The control vessel would also control and monitor liquid cargo and seawater ballast pump and valve systems and seawater systems for firefighting and tank cleaning. A system for channeling diesel engine exhaust to the tanker for purging of petroleum cells, to reduce the chance of explosion during cleaning, can also be controlled by the control vessel.

The relatively shallow draft of the supertanker configuration of the present invention would, of course, yield relatively less net tonnage than a conventional supertanker. However, some of the net tonnage lost through reduction in hull depth would be offset somewhat by net tonnage gained through revenue utilization of space normally occupied by engines, fuel tanks and crew accommodations. The overall loss of net tonnage in the shallow drafted supertanker is also largely offset, by the ability of the vessel to use most existing ports and port facilities. It is also estimated that the shallow drafted supertanker hull powered by six power modules and utilizing the previously described special bow would be capable of speeds comparable to its conventional counterparts.

As mentioned, loading and unloading of a supertanker idles the ship and crew for more than four days at each end of a voyage. This factor can be considerably reduced with a supertanker system of the present invention. The crew, who live and work primarily on the control module vessel end power module vessels of the composite transport can deliver an empty or full cargo unit tanker vessel to its destination, detach, and immediately reconnect to a similar vessel, full or empty waiting to be moved. The turn around time would be the less than full day required to refuel and reprovision. The resulting time savings would be seven days per round trip.

Another area of possible time reduction results from the shallow draft feature of this invention which allows the vessel to enter port and moor at dockside where a massive onshore pumping system can be brought to bear for loading and unloading. With deepwater pumping anchorages miles at sea, this type of pumping may not be possible. Chances of oil spill is also substantially reduced with dockside pumping and those which do occur are considerably easier to control.

The substantially uniform basically rectangular cross section extending the full length of the midship's cargo section of the cargo unit vessel hull 18 also permits consideration of an alternate functional embodiment of the hull configuration. This embodiment comprises segmenting the midship section of the hull to yield interchangeable, interlocking hull sections 65 as shown in FIG. 1, each nominally 150 feet long in the illustrated case. The sections, completely watertight, can be individually loaded at various dock facilities, each for a specific future port of call, and then be rigidly interconnected with watertight bow and stern sections 26 and 48 respectively to form a complete cargo hull ready for ocean passage. As successive ports along the route of the vessel are called upon, cargo segments, loaded specifically for their respective ports, are disconnected from the hull system and replaced by preloaded (or empty) segments destined for projected ports of call.

Any suitable coupling devices may be employed for detachably interconnecting the hull segments and the hull end segments to the bow and stern. Also any different locking mechanisms can be employed in the couplings. Saltwater ballast systems in each hull segment facilitate segment alignment during connecting and disconnecting of the segments.

It will therefore be seen that the invention provides an improved ocean going composite cargo transport of efficient versatile characteristics suiting it for substantially any kind of service now being provided by large conventional ships, container ships, roll-ons, roll-off ships, lighter onboard ships and tankers of various types. Moreover, the improved transport system lends itself to various means of propulsion and control including a preferred means herein disclosed as part of the present invention. It is not intended that the novel concepts disclosed be limited in form to the specific details of the illustration and description of the preferred embodiment, but can assume a number of different forms within the intended scope of the claims which follow.

What is claimed is:

1. An ocean going cargo transport comprising a cargo vessel hull having an elongated generally flat-bottomed midship section, and stern and bow sections joined to the respective aft and forward ends of said midship section, and propulsion means operable to propel said hull at cruising speed, said midship section having substantially vertical sides extending downwardly substantially to the plane of its bottom, said bow section having upright sides merging with the respective sides of said midship section, converging together forwardly therefrom, and sloping laterally outward and upward to form a tapered bow with outward flare, said bow section having a bottom comprising a submerged forwardly projecting substantially horizontal bottom panel which in planform has side edges that extend generally forwardly in substantial alignment with the sides of the midship section, said submerged bottom panel being cantilevered from the hull and having a substantially flat horizontal bottom surface generally coplanar with the midship section bottom, said panel having a substantially flat horizontal top surface, the forwardly projecting length and vertical thickness of the bow bottom panel being predetermined to create a wave ahead of the bow during forward cruising speed of the vessel, the trough of which wave is presented to the converging sides of the bow.

2. The cargo transport defined in claim 1, and propulsion means comprising at least one propulsion module vessel detachably connected to the stern of the cargo vessel hull and itself comprising an independent seaworthy vessel when detached from said hull.

3. The cargo transport defined in claim 2 wherein the bow bottom panel in platform has a forward leading edge curved convexly across the width of the bottom panel.

4. The cargo transport defined in claim 3 wherein in planform the leading edge curvature of the bottom panel approximates a circular arc.

5. The cargo transport defined in claim 4 wherein the bow section includes concave fillet plating in the juncture between the top surface of the bottom panel and the bow sides.

6. The cargo transport defined in claim 1 wherein the propulsion means comprises a plurality of propulsion module vessels detachably secured to the stern section of the vessel hull at spaced locations across the width of the hull to push the same forwardly, said propulsion module vessels being detachably secured to each other in side-by-side relationship and when detached from the vessel hull constituting an independent seaworthy means of transportation for crew members.

7. The cargo transport defined in claim 6 wherein the stern section of the vessel hull has a bottom merging with the flat bottom of the midship section and sloping upwardly to the aft end of the stern section, said upwardly sloping bottom having a plurality of skegs thereon with upright trailing edges to which the propulsion module vessels are detachably secured.

8. The cargo transport defined in claim 6 and a separate control module vessel detachably secured to the stern section of the vessel hull and including control means with connecting elements extending between said control module vessel and the propulsion module vessels to permit controlling the latter from said control module vessel.

9. The cargo transport defined in claim 8 wherein the control module vessel includes a variably elevatable helm house mounted thereon with monitor and control means therein to permit monitoring and controlling operation of the cargo transport from a selectively elevated vantage point.

10. The cargo transport defined in claim 6 wherein the control module vessel is stationed between propulsion module vessels and is detachably secured thereto in side-by-side relationship, said control module vessel including a helm house thereon with monitor and control means therein for the propulsion module vessels, and means on the control vessel operable to variably elevate said helm house above vessel hull to afford navigational visibility.

11. The cargo transport defined in claim 2 wherein the propulsion module vessels each comprise an elongated submerged torpedo-shaped horizontally disposed drive unit having propulsion and steering elements thereon, streamlined housing means projecting upwardly to above water level from the top side of said drive unit, and flotation collar means at least partially surrounding said housing means at a location intermediate the top and bottom thereof providing flotation and stabilization of the power module vessel when detached from and operated independently of the cargo transport vessel hull.

12. The cargo transport defined in claim 11 including detachable coupling means situated forwardly on the flotation collar means and complemental coupling means engageable therewith on the stern of the cargo vessel hull.

13. The cargo transport defined in claim 12 wherein the power module vessels further each include coupling means on at least one laterally facing side of the flotation collar means adapted for detachable securement to complemental coupling means on the flotation collar means of an adjacent propulsion module vessel likewise detachably coupled to the cargo vessel hull stern.

14. The cargo transport defined in claim 13 wherein the cargo vessel hull stern section has a bottom merging with the bottom of the midship section and sloping upwardly therefrom to the aft end of said stern section, said stern section having a plurality of upright skegs located thereon at spaced intervals across the width of the stern section, said skegs having upright trailing edges with detachable coupling means thereon, and said propulsion module vessels each having on their respective drive units detachable coupling means complemental to the first-mentioned coupling means, for interconnecting the drive units with the respective skegs.

15. The cargo transport defined in claim 12 wherein the upright housing of the power module vessel is adjustably movable vertically in and relative to the flotation collar means and the drive unit and skeg coupling means permit relative vertical movement between each such drive unit and skeg to vary the depth of submersion of the drive unit below the flotation collar means, hence in relation to the cargo vessel hull.

16. The cargo transport defined in claim 12 including means to adjustably vary the depth of submersion of the drive unit in relation to the cargo vessel hull.

17. The cargo transport defined in claim 14 wherein detachable coupling means comprise rotary lock elements and complemental socket elements.

18. An ocean going cargo carrier comprising an elongated cargo vessel hull having a bottom which is substantially flat across substantially the full width of the hull and extends forwardly substantially to the forward bottom extremity of the hull, the sides of the hull extending upwardly substantially from the level of the hull bottom to form a generally rectangular hull cross section over the major portion of its length in the waist to a location displaced aft of said forward bottom extremity by a small fraction of the hull length, at which location said sides converge forwardly and undergo outward and upward slope to form an outwardly and forwardly flared bow, said flared bow having a central forward end at its top which substantially directly overlies said forward bottom extremity, and said flared bow further having a central forward end at its bottom which lies aft of said forward bottom extremity, and substantially horizontal panel means having a generally flat bottom surface substantially coplanar with the hull bottom, extending across substantially the full width of the hull and projecting forwardly from the bottom of the flared bow in substantially congruent relationship with the forward end of the hull, said panel means having an upper surface spaced above its bottom surface a small fraction of the height of the hull at the bow thereof, said panel means and hull bottom forward end being interconnected at least partially around their commonly congruent perimeter so as to form a forwardly projecting cantilevered bottom panel at the bow end of the vessel submerged at all loadings of the vessel and operable by producing a separate bow wave ahead of the flared bow to reduce hull drag and protect the hull bow during cruising in heavy seas.

19. The ocean going cargo carrier defined in claim 18 wherein the hull bottom slopes upwardly to the stern end thereof from a location displaced a small fraction of the length of the hull forwardly of said stern end.

20. The ocean going cargo carrier defined in claim 19 wherein the sloping bottom portion at the stern of the vessel hull has a plurality of upright longitudinally extending skegs positioned at spaced intervals across the width of the vessel hull.

21. The cargo carrier defined in claim 20, and a plurality of power module vessels operable to propel the cargo vessel hull, detachably connected to said hull at selected stations abreast spaced across the stern of said hull, and wherein the cargo vessel hull has a generally flat and uninterrupted open upper deck upon which to store cargo, and substantially uninterrupted internal hold space beneath said upper deck for stowage of cargo.

22. The cargo carrier defined in claim 21 wherein the cargo vessel hull is sectioned lengthwise thereof, by transversely disposed divider walls, each such section comprising a watertight enclosure detachably coupled to one or more adjacent sections so as to form a composite elongated hull of said sections connected in series arrangement.

23. A vessel hull comprising, in combination with a bow portion thereof including forwardly convergent sides joined to a generally horizontal bottom, a generally horizontally disposed wave-making plate, of a thickness a small fraction the height of the bow portion positioned generally coplanar with and forwardly of the hull bottom, said plate having a forward edge portion forwardly convexly curved in plan, said plate extending aft therefrom and laterally outward symmetrically from the longitudinal centerline of said hull, and faired stiffener means joined to the bow portion structurally supporting said plate in said position, said strut means being formed and located for permitting water flowing relatively aft over the plate to diverge outwardly into parallel laminar flow relative to water flowing past the hull portion, whereby water flowing relatively aft over the top of said plate forms a separate bow wave effectively reducing the drag of the bow portion and wave impact on the bow portion.

24. The combination defined in claim 23, wherein the plate is joined at its after end portion to the hull portion sides adjacent the chine of the hull.

25. The combination defined in claim 24, wherein the bow portion is pointed above water level and the stiffener means is wedge-shaped in horizontal section, having an upright forward apex continuing vertically into the upper portion of the bow point and having upright sides which diverge rearwardly and form a filleted juncture with the bow portion sides.

* * * * *

UNITED STATES PATENT AND TRADEMARK OFFICE
CERTIFICATE OF CORRECTION

PATENT NO. : 3,934,531
DATED : January 27, 1976
INVENTOR(S) : Rudolph A. Allen

It is certified that error appears in the above-identified patent and that said Letters Patent are hereby corrected as shown below:

Column 19, line 54: change the word "platform" to --planform--.

Column 20, line 30: add the word --module-- between the words "control" and "vessel".

Column 20, line 31: add the word --said-- between the words "above" and "vessel".

Column 22, line 35: change the word "strut" to --stiffener--.

Signed and Sealed this eleventh Day of May 1976

[SEAL]

Attest:

RUTH C. MASON
Attesting Officer

C. MARSHALL DANN
Commissioner of Patents and Trademarks